US009483273B2

(12) United States Patent
Spadini et al.

(10) Patent No.: US 9,483,273 B2
(45) Date of Patent: Nov. 1, 2016

(54) DEPENDENT INSTRUCTION SUPPRESSION IN A LOAD-OPERATION INSTRUCTION

(71) Applicant: Advanced Micro Devices, Inc., Sunnyvale, CA (US)

(72) Inventors: Francesco Spadini, Austin, TX (US); Michael Achenbach, Austin, TX (US); Emil Talpes, San Mateo, CA (US); Ganesh Venkataramanan, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 578 days.

(21) Appl. No.: 13/943,310

(22) Filed: Jul. 16, 2013

(65) Prior Publication Data
US 2015/0026686 A1 Jan. 22, 2015

(51) Int. Cl.
*G06F 9/38* (2006.01)
*G06F 9/30* (2006.01)

(52) U.S. Cl.
CPC ......... *G06F 9/3836* (2013.01); *G06F 9/30043* (2013.01)

(58) Field of Classification Search
None
See application file for complete search history.

(56) References Cited

U.S. PATENT DOCUMENTS

| | | | |
|---|---|---|---|
| 6,249,862 B1 | 6/2001 | Chinnakonda et al. | |
| 6,735,688 B1 * | 5/2004 | Upton | G06F 9/3838 712/218 |
| 6,981,129 B1 * | 12/2005 | Boggs | G06F 9/3842 712/218 |
| 2003/0126406 A1 * | 7/2003 | Hammarlund | G06F 9/3861 712/200 |
| 2008/0028193 A1 | 1/2008 | Dhodapkar | |
| 2013/0013862 A1 * | 1/2013 | Kannan | A61B 5/0538 711/119 |
| 2014/0025933 A1 * | 1/2014 | Venkataramanan | G06F 9/3836 712/208 |
| 2014/0181476 A1 | 6/2014 | Srinivasan et al. | |
| 2014/0380023 A1 | 12/2014 | Smaus et al. | |
| 2014/0380024 A1 | 12/2014 | Spadini et al. | |
| 2015/0026685 A1 | 1/2015 | Spadini et al. | |
| 2015/0026686 A1 | 1/2015 | Spadini et al. | |

OTHER PUBLICATIONS

Non-Final Office Action mailed Dec. 18, 2015 in U.S. Appl. No. 13/943,264, 19 pages.
Non-Final Office Action mailed Nov. 24, 2015 in U.S. Appl. No. 13/926,184, 14 pages.
Non-Final Office Action mailed Nov. 24, 2015 in U.S. Appl. No. 13/926,193, 16 pages.

(Continued)

*Primary Examiner* — Jacob A Petranek

(57) ABSTRACT

A method includes suppressing execution of an operation portion of a load-operation instruction in a processor responsive to an invalid status of a load portion of load-operation instruction. A processor includes an instruction pipeline including an execution unit operable to execute instructions and a scheduler unit. The scheduler unit includes a scheduler queue and is operable to store a load-operation in the scheduler queue. The load-operation instruction includes a load portion and an operation portion. The scheduler unit schedules the load portion for execution in the execution unit, marks the operation portion in the scheduler queue as eligible for execution responsive to scheduling the load portion, receives an indication of an invalid status of the load portion, and suppresses execution of the operation portion responsive to the indication of the invalid status.

13 Claims, 4 Drawing Sheets

(56) References Cited

OTHER PUBLICATIONS

Final Office Action mailed Mar. 17, 2016 in U.S. Appl. No. 13/926,184, 20 pages.

Final Office Action mailed Mar. 15, 2016 in U.S. Appl. No. 13/926,193, 22 pages.

* cited by examiner

| LOAD PORTION 310 | SCH | XRF | EX0 | EX1 Tag | DC2 Invalid Status | DC3 |
|---|---|---|---|---|---|---|
| OPERATION PORTION 320 | Sleep | Sleep | Sleep | RDY Awake | Awake | Sleep |
| | 330 | 340 | 350 | 360 | 370 | 380 |

FIG. 3A

| LOAD PORTION 310 | SCH | XRF | EX0 | EX1 Tag | DC2 Bad Status | DC3 |
|---|---|---|---|---|---|---|
| OPERATION PORTION 320 | Sleep | Sleep | Sleep | RDY Awake | Awake | ~~Sleep~~ Awake |
| LOAD PORTION REPLAY 310' | | | SCH | XRF | EX0 | EX1 Tag |
| | 330 | 340 | 350 | 360 | 370 | 380 |

FIG. 3B

DEPENDENT INSTRUCTION SUPPRESSION IN A LOAD-OPERATION INSTRUCTION

BACKGROUND

1. Field of the Disclosure

The present disclosure generally relates to processors, and more particularly, to suppression of dependent instructions in a load-operation instruction.

2. Description of the Related Art

Processors typically enhance processing efficiency by employing out-of-order execution, whereby instructions are executed in an order different from the program order of the instructions. In replay processors, in addition to out-of-order execution, instructions may be executed speculatively based on an assumption that the memory subsystem will provide requested data prior to the execution of the instruction. For example, a speculative load instruction may be executed based on the assumption that a previous store instruction will have been completed so that the data for the load instruction is available. A scheduler unit in the processor schedules and tracks speculatively executed instructions. Data from a speculative load instruction may be used by other instructions to perform other operations. The load instruction may be referred to herein as the "parent instruction" and the other instructions that use data from the speculative load instruction are referred to herein as "dependent instructions" or alternatively, "child instructions." Multiple levels of dependency may be present in that a particular parent instruction may have a dependent child instruction, and the child instruction may have one or more dependent instructions of its own.

A speculatively executed load instruction may generate invalid results due to a load failure, for example, because the memory subsystem is not ready to provide the data for the load. In response to identifying the invalid status of a speculatively executed instruction, the scheduler unit may replay or reissue the instruction with the invalid status and any of its dependents that had also been speculatively executed so that they can be executed with the correct operand data. Because the scheduler unit speculatively issues instructions that span multiple levels of dependency, the number of instructions subject to replay may be significant, and thus negatively impact performance and power consumption at the processor.

BRIEF DESCRIPTION OF THE DRAWINGS

The present disclosure may be better understood, and its numerous features and advantages made apparent to those skilled in the art by referencing the accompanying drawings.

FIG. 3A is a pipeline diagram illustrating the suppression of an operation portion of a load-operation instruction responsive to identifying an invalid status of a load portion of the load-operation instruction in accordance with some embodiments.

FIG. 3B is a pipeline diagram illustrating contention between a sleep request for the operation portion and an awake request initiated by a replay of the load portion in accordance with some embodiments

The use of the same reference symbols in different drawings indicates similar or identical items.

DETAILED DESCRIPTION

FIGS. 1-5 illustrate example techniques for suppressing the execution of an operation portion of a load-operation instruction in situations where the load portion of the load-operation instruction returns an invalid status prior to scheduling of the operation portion.

A processor may attempt to improve performance by speculatively executing instructions. In a speculative processor, dependent instructions of load instructions are typically made eligible for execution prior to identifying whether the status of the load instruction is valid or invalid. Thus, the dependents of the load instruction are made eligible for execution when the load instruction is scheduled for execution. If the load instruction returns an invalid status, the dependents that were speculatively executed would also necessarily have invalid status, as they would have operated using invalid data.

In some processor architectures, a load operation and an arithmetic operation may be combined into a single instruction, referred to herein as a "load-operation." Although the load-operation instruction is a single instruction, the load portion and the operation portion are scheduled for execution separately. In a speculative environment, the operation portion may be scheduled for execution prior to determining the valid or invalid status of the load portion. As described in greater detail herein, because the dependency relationship between the load portion and the operation portion is known by the scheduler unit, the execution of the operation portion may be suppressed if the load portion returns an invalid status. The processor may suppress the operation portion by marking it as ineligible for execution. Suppressing the operation portion also suppresses dependents of the load-operation instruction that could have been themselves speculatively executed with necessarily invalid status. The suppression of the operation portion and dependent instructions of the load-operation instruction thereby prevents their execution and conserves processor resources and power that would have been otherwise expended executing instructions that necessarily have invalid status due to the invalid status of the ancestor load instruction.

Figure 1:
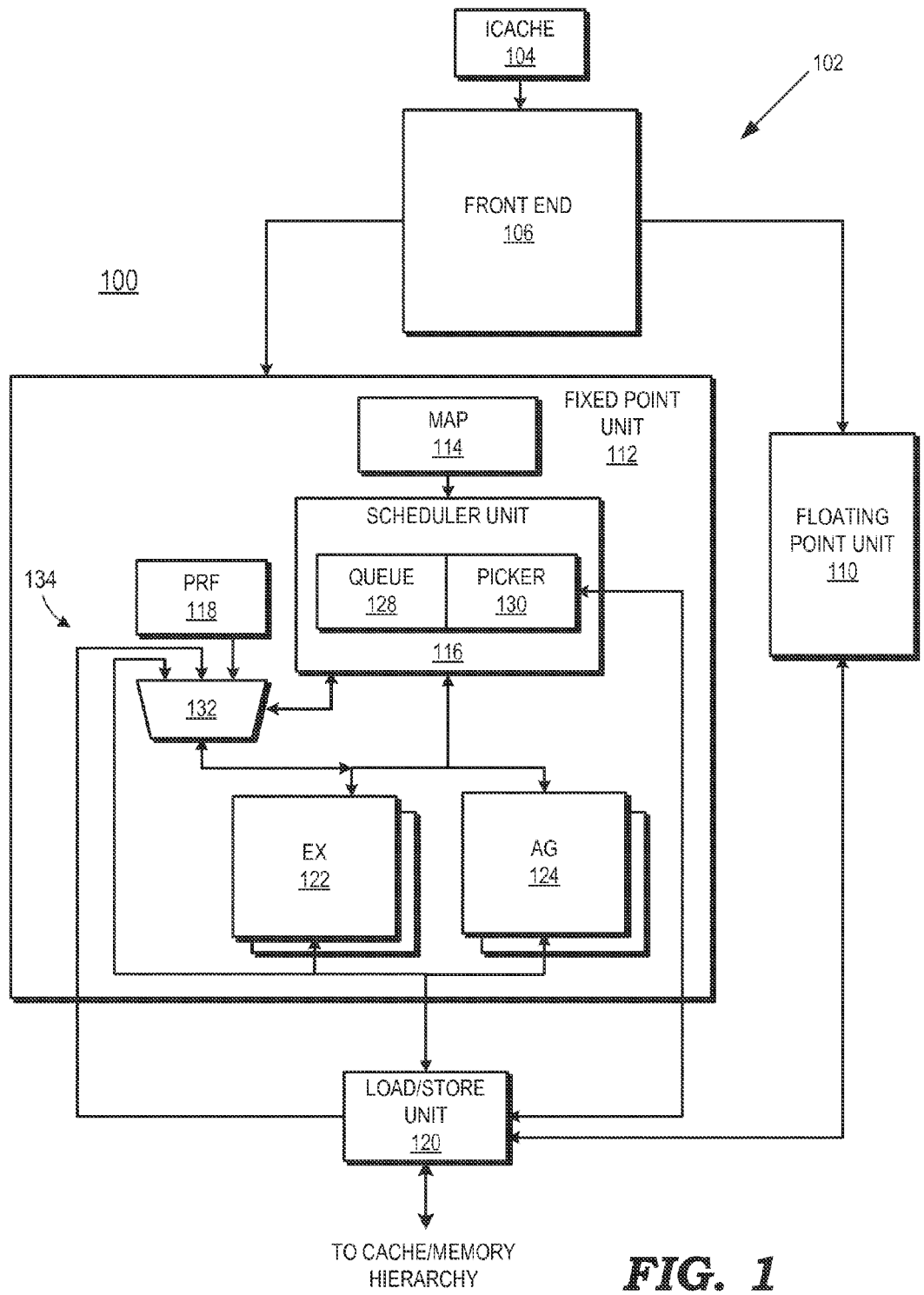
FIG. 1 is a block diagram of a processor core in accordance with some embodiments.

FIG. 1 illustrates a processor core 100 of a processor having an execution pipeline 102 that implements dependent instruction suppression in accordance with some embodiments. The illustrated processor core 100 can include, for example, a central processing unit (CPU) core based on an x86 instruction set architecture (ISA), an ARM ISA, and the like. The processor can implement a plurality of such processor cores, and the processor can be implemented in any of a variety of electronic devices, such as a notebook computer, desktop computer, tablet computer, server, computing-enabled cellular phone, personal digital assistant (PDA), set-top box, game console, and the like.

In the depicted example, the execution pipeline 102 includes an instruction cache 104, a front end 106, one or more floating point units 110, and one or more fixed point units 112 (also commonly referred to as "integer execution units"). The processor core 100 also includes a load/store unit (LSU) 120 connected to a memory hierarchy, including one or more levels of cache (e.g., L1 cache, L2, cache, etc.), a system memory, such as system RAM, and one or more mass storage devices, such as a solid-state drive (SSD) or an optical drive.

The instruction cache 104 stores instruction data that is fetched by the front end 106 in response to demand fetch operations (e.g., a fetch to request the next instruction in the instruction stream identified by the program counter) or in response to speculative prefetch operations. The front end 106 decodes the fetched instructions into one or more operations that are to be performed, or executed, by either the floating point unit 110 or the fixed point unit 112. In a microcoded processor architecture, this decoding can include translating the instruction into one or more micro-operations (uOps), whereby each uOp is identified by a corresponding opcode value and can be separately executed within the fixed point unit 112. Those operations involving floating point calculations are dispatched to the floating point unit 110 for execution, whereas operations involving fixed point calculations are dispatched to the fixed point unit 112.

The fixed point unit 112 includes a map unit 114, a scheduler unit 116, a physical register file (PRF) 118, and one or more execution (EX) units 122 (e.g., an arithmetic logic units (ALU)) and one or more address generation (AG) units 124. In general, both the EX units 122 and the AG units 124 are considered to be execution units in that they execute instructions. Operations requiring retrieval or storage of data, such as load or store operations, are dispatched by the picker 130 to an AG unit 124, which calculates the memory address associated with the operation and directs the LSU 120 to perform the corresponding memory access using the generated address. Operations requiring numerical manipulations or other arithmetic calculations are dispatched to the appropriate EX unit 122 for execution.

The PRF 118 stores a set of physical registers, each of which is associated with a different physical register name (PRN). For convenience, as used herein the PRN can refer to the name of the physical register, and can refer to the physical register that has that name. Thus, for example, "storing data at a PRN" indicates that the data is stored at the physical register identified by the PRN.

The scheduler unit 116 includes a scheduler queue 128 and a picker 130. In an operation of the fixed point unit 112, the map unit 114 receives operations from the front end 106 (usually in the form of operation codes, or opcodes). These dispatched operations typically also include, or reference, operands used in the performance of the represented operation, such as a memory address at which operand data is stored, an architected register at which operand data is stored, one or more constant values (also called "immediate values"), and the like. The map unit 114 and the scheduler unit 116 control the selective distribution of operations among the EX units 122 and AG units 124, whereby operations to be performed are queued in the scheduler queue 128 and then picked therefrom by the picker 130 for issue to a corresponding EX unit or AG unit. Typically, each queue entry of the scheduler queue 128 includes a field to store the operation payload or operation identifier (e.g., the opcode for the operation), fields for the addresses or other identifiers of physical registers that contain the source operand(s) for the operation, fields to store any immediate or displacement values to be used with the operation, and a destination field that identifies the physical register in which the result of the execution of the corresponding operation is to be stored. For example, a load operation instruction includes address information indicating the target of the load instruction and an architected register operand indicating the PRN that receives the data from the target address, and one or more architectured operands specifying the data for the operation portion to use in its arithmetic operation.

Prior to storing an operation in the scheduler queue 128, the map unit 114 performs register renaming whereby external operand names (i.e., architected register names (ARNs)) are translated into internal operand names (i.e., PRNs). This renaming process includes the map unit 114 evaluating a subset of operations including the operation to be queued to identify some dependencies between sources and destinations associated with the operations, and then mapping architected registers to physical registers so as to avoid false dependencies and facilitate parallel execution of independent operations as using register renaming techniques known in the art.

The picker 130 monitors the scheduler queue 128 to identify operations ready for execution, and upon picking an available operation and verifying its operands are ready and available, dispatches the operation to an EX unit 122 or an AG unit 124. The picker 130 waits to pick operations for a dependent instruction until it receives an indication that the operations for the parent instruction(s) have been implemented or scheduled. For a load-operation instruction, the picker schedules the load portion for execution by an AG unit 124 and awakes the operation portion to make it eligible for speculative execution by the EX unit 122 in response to the scheduling of the load portion.

Because the load and operation portions of the load-operation instruction are scheduled separately, the picker 130 may speculatively schedule the operation portion for execution prior to determining the valid or invalid status of the load portion. As described in greater detail herein, the operation portion may be suppressed by the scheduler unit 116 after an indication is received that the load portion had an invalid status by placing the operation back to a sleep state, thereby preventing the speculative execution of the operation portion and the awakening of the dependents of the load-operation instruction portion that would occur if the operation portion were to be scheduled for execution. In some embodiments, an invalid status indication for the load portion may result from a data cache miss, a store-to-load forwarding error due to the store data not being ready or replay safe, store-to-load forwarding retries, or a miss in a translation look-aside buffer (not shown), which stores information for virtual to physical address translations.

The address generation operations performed by the AG units 124 and the arithmetic operations performed by the EX units 122 typically utilize operand data. The operands referenced by an instruction being executed typically refer to data by PRN, which was converted from a reference to an ARN by the map unit 114, as described above. Load operations performed by the AG unit 124/LSU 120 and arithmetic operations performed by the EX unit 122 result in data that is to be stored in the PRF 118 for the PRN identified as the destination of the load operation or arithmetic operation. Accordingly, each of the EX unit 122 and the LSU 120, upon generating a result (either by completing an arithmetic operation for the EX unit 122 or by loading data from the memory hierarchy for the LSU 120), initiates a PRF write to the destination PRN of the load instruction.

The scheduler unit 116 controls a multiplexer 132 to implement a data bypass network 134 to select a data source provided to an execution unit 122, 124 for implementing an instruction to avoid waiting for a PRF write. The scheduler unit 116 implements data forwarding by comparing the destination PRN of the parent instruction against the source PRN of the dependent instruction to identify a match. The scheduler unit 116 configures the multiplexer 132 to select the PRF 118 as its data source for data that has been previously stored in a particular PRN. If the PRN of the data source for an operand matches the destination PRN of an operation being completed by the EX unit 122, the scheduler unit 116 configures the multiplexer 132 to select the output of the EX unit 122 as its data source. For data being retrieved by the LSU 120 from the memory hierarchy that has a destination PRN matching the PRN referenced by an operand of the executing instruction, the scheduler unit 116 configures the multiplexer 132 to select the LSU 120 as its data source after receiving an indication from the LSU 120 that the data is available. Selecting the EX unit 122 or the LSU 120 as the data source reduces latency by obviating the need to first store the results in the PRF 118. For a load-operation instruction, the LSU 120 is generally the data source for the operation portion, so the data bypass network 134 is configured to forward the data retrieved by the LSU 120 for the load portion to the operation portion.

Figure 2:
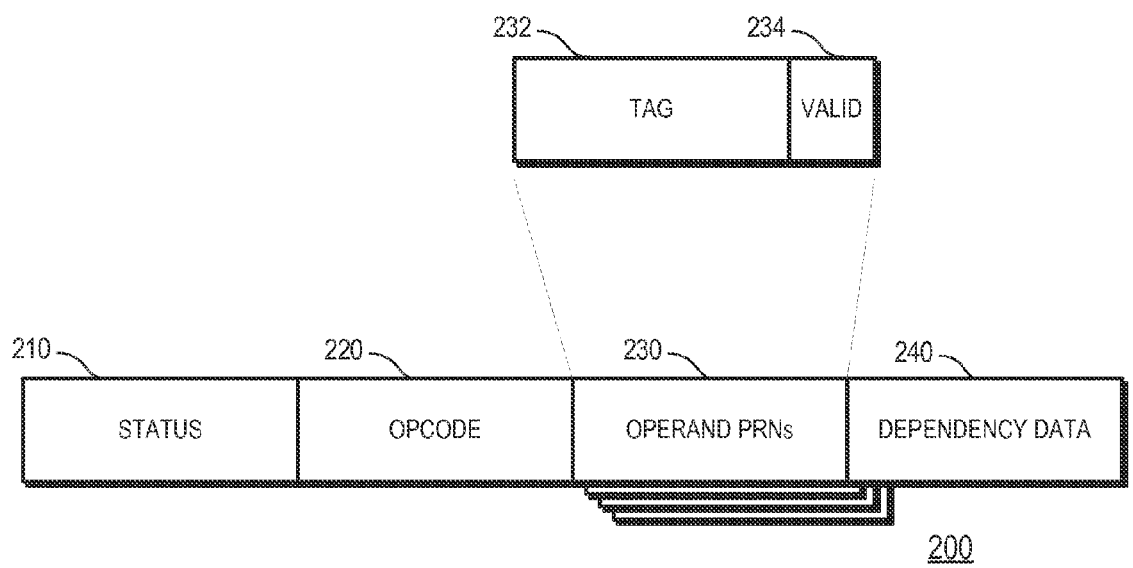
FIG. 2 is a block diagram of an entry of a scheduler queue of the processor core of FIG. 1 in accordance with some embodiments.

FIG. 2 illustrates a scheduler queue entry 200 in accordance with some embodiments. The scheduler queue entry includes a status field 210, an opcode field 220, and operand physical register number (PRN) fields 230. The status field 210 provides a status indicator of the instruction in the scheduler queue 128. The values of the status field 210 are used by the picker 130 to determine the eligibility of the instruction for scheduling. For example, a status of AWAKE indicates that the instruction is available to be scheduled for execution. A status of SLEEP indicates that the instruction is a dependent of a different instruction that has not yet progressed to a state of completion that triggers the awakening of its dependents. A status of INVALID indicates that an error has occurred with the instruction, and that it may need to be replayed. The opcode field 220 indicates the operation specified by the instruction. For a load-operation instruction, the status field 210 tracks the status for the load portion and the operation portion separately. When the load-operation instruction is selected by the picker 130 for execution in the AG unit 124, the operation portion is awoken by setting its status from SLEEP to AWAKE.

The operand PRN fields 230 include tags 232 for the PRNs specified by the operands of the instruction and valid bits 234. The number of operand PRN fields 230 may vary depending on the particular architecture of the processor core 100. For purposes of the following illustrations, the number of operand PRN fields 230 is assumed to be four. In the context of the data bypass network 134, the tag 232 indicates that the source for the data corresponding to the PRN is the PRF 118, the EX unit 122, or the LSU 120. The valid bit 234 for each tag 232 is set when the data associated with the source is ready. For example, if the operand data is already resident in the PRF 118, the valid bit 234 may be set. For operand data coming from the EX unit 122, the valid bit 234 may be set when the instruction is being executed, so the result can be read when the data is available. For operand data coming from the LSU 120, the valid bit 234 may be set when the data is being received by the LSU 120.

In some embodiments, for a load-operation instruction, two operands are used for address generation for the load portion and two operands may be used by the operation portion. One of the operation operands is associated with the load data retrieved by the load portion and the other operand may be used to perform an arithmetic operation with the retrieved load data. The valid bit 234 for the tag 232 associated with the load data is set by the LSU 120 when the data is available.

FIG. 3A is a pipeline diagram 300 illustrating the suppression of an operation portion of a load-operation instruction responsive to identifying an invalid status of a load portion of the load-operation instruction in accordance with some embodiments. The pipeline progressions for a load portion 310 and an operation portion 320 of a load-operation instruction are shown. The load portion 310 may be executed in an AG unit 124, and the operation portion may be processed by an EX unit 122 if it were to be executed.

Event 330 represents the schedule stage (SCH) for the load portion 310, during which the load portion is picked for execution by the picker 130 in the AG unit 124. The load portion 310 and the operation portion 320 are scheduled separately. The operation portion 320 has a status of SLEEP. Event 340 represents the register file stage (XRF), where operands are read for the load portion 310. Register operands are read from the PRF 118 and immediate/displacement operands are read out of a payload structure holding data known at dispatch time. Event 350 represents the first execution stage (EX0) for the load portion 310, where the load address is calculated and sent to the LSU 120 for data retrieval.

Event 360 represents the second execution stage (EX1) during which a tag associated with the load portion 310 is employed by the scheduler unit 116 to as an awake request to mark the operation portion 320 eligible for execution. The tag broadcast awakes the operation portion 320 instruction in event 360 designated by its ready stage (RDY) and its status of AWAKE (in the status field 210 of FIG. 2). During event 370, an invalid status indication is received for the load portion 310 during its data cache stage (DC2) stage. For example, an invalid status may be the result of a data cache miss, a store-to-load forwarding error, a store-to-load forwarding retry, or a miss in the TLB.

During event 380, the invalid status received in event 370 triggers a sleep request in the scheduler unit 116 to suppress execution of the operation portion 320 by removing it from the list of instructions eligible for execution. The scheduler unit 116 places the operation portion 320 back to a SLEEP status in the status field 210, thereby preventing the picker 130 from scheduling it for execution in the EX unit 122. Also, because the operation portion 320 is not subsequently picked by the picker 130, there will be no awakening of dependent instructions of the load-operation instruction, which would have occurred if the picker 130 were to have scheduled the operation portion 320. This additional suppression avoids speculative execution of the dependents, which would also necessarily have invalid status.

FIG. 3B is a pipeline diagram 390 illustrating contention between a sleep request for the operation portion 320 and an awake request initiated by a load portion replay 310' in accordance with some embodiments. In some instances, the load portion replay 310' may be issued soon after the initial load portion 310. The LSU 120 sometimes requires additional cycles to perform certain operations. For example, a misaligned address relates to data spanning two different cache lines. The LSU 120 requires additional time to assemble the data correctly, however, it is not until late in the address calculation that it is apparent that the data spans multiple cache lines. The scheduler unit 116 issues the load portion replay 310' during event 350 after identifying the misaligned address. The tag broadcast for the load portion replay 310' occurs during event 380, triggering an awake request for the operation portion 320, which is received at the same time that the sleep request triggered by the invalid status of the load portion 310 is received. The scheduler unit 116 prioritizes awake requests over sleep requests based on an assumption that the load portion replay 310' is a valid flow and the operation portion 320 should remain eligible for execution.

Figure 4:
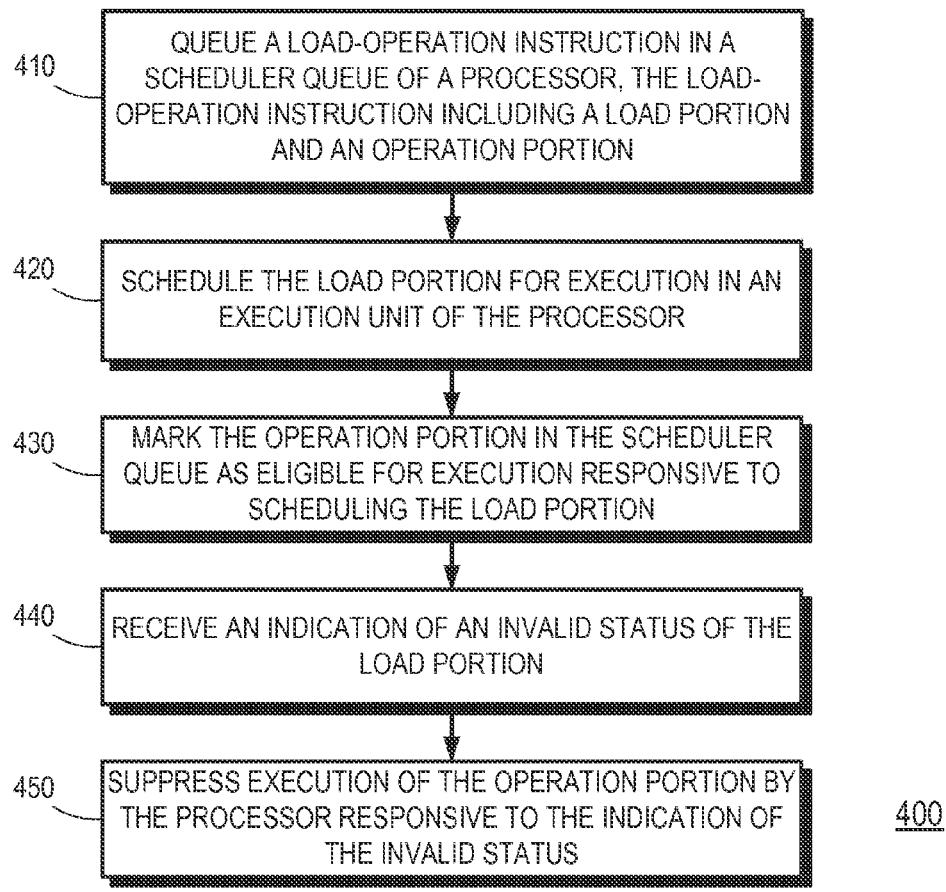
FIG. 4 is a flow diagram of a method for suppressing execution of an operation portion of a load-operation instruction responsive to identifying an invalid status of a load portion of the load-operation instruction in accordance with some embodiments.

FIG. 4 is a flow diagram of a method 400 for suppressing execution of an operation portion 320 of a load-operation instruction responsive to identifying an invalid status of a load portion 310 of the load-operation instruction in accordance with some embodiments. In method block 410, a load-operation instruction including a load portion 310 and an operation portion 320 is queued in a scheduler queue 128 of a processor. In method block 420, the load portion 310 is scheduled for execution in an execution unit 124 of the processor. In method block 430, the operation portion 320 is marked in the scheduler queue 128 as eligible for execution responsive to scheduling the load portion 310. In method block 440, an indication of an invalid status of the load portion 310 is received. In method block 450, execution of the operation portion 320 by the processor is suppressed responsive to the indication of the invalid status.

By suppressing the operation portion 320 of the load-operation instruction, the expenditure of processor resources on instructions that will need to be replayed with the failed load portion of the load-operation instruction is avoided. The processor resources may be used to execute other instructions. Suppressing instructions in this manner increases processor performance and reduces power consumption.

In some embodiments, at least some of the functionality described above may be implemented by one or more processors executing one or more software programs tangibly stored at a computer readable medium, and whereby the one or more software programs comprise instructions that, when executed, manipulate the one or more processors to perform one or more functions of the processing system described above. Further, in some embodiments, serial data interfaces described above are implemented with one or more integrated circuit (IC) devices (also referred to as integrated circuit chips). Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but are not limited to, optical media (e.g., compact disc (CD), digital versatile disc (DVD), or Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 5:
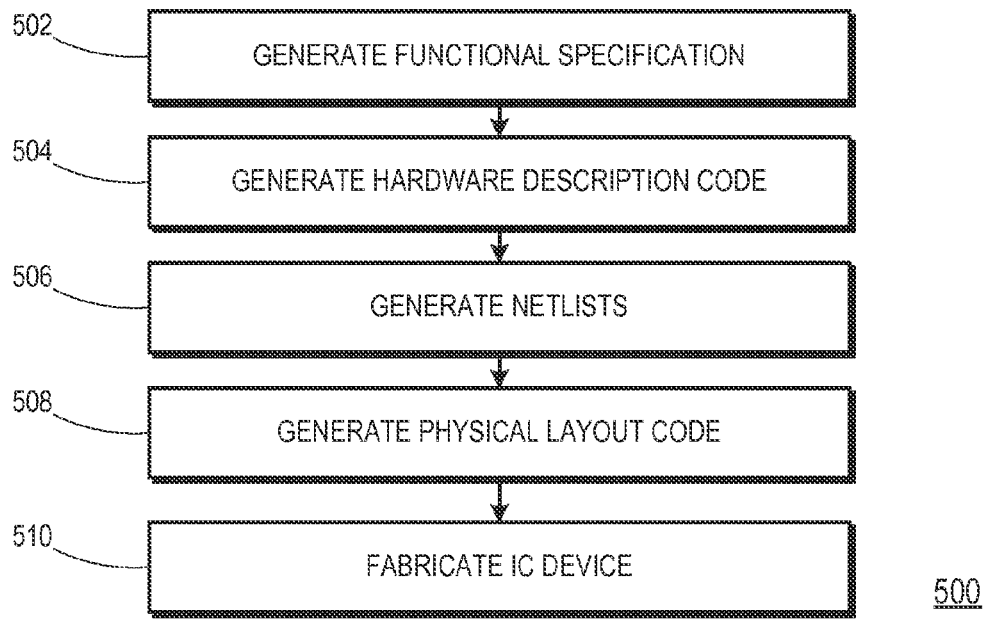
FIG. 5 is a flow diagram illustrating a method for designing and fabricating an integrated circuit device implementing at least a portion of a component of a processor in accordance with some embodiments.

FIG. 5 is a flow diagram illustrating an example method 500 for the design and fabrication of an IC device implementing one or more aspects in accordance with some embodiments. As noted above, the code generated for each of the following processes is stored or otherwise embodied in computer readable storage media for access and use by the corresponding design tool or fabrication tool.

At block 502 a functional specification for the IC device is generated. The functional specification (often referred to as a micro architecture specification (MAS)) may be represented by any of a variety of programming languages or modeling languages, including C, C++, SystemC, Simulink, or MATLAB.

At block 504, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 506 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 508, one or more EDA tools use the netlists produced at block 506 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 510, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

As disclosed herein, in some embodiments a method includes suppressing execution of an operation portion of a load-operation instruction in a processor responsive to an invalid status of a load portion of the load-operation instruction.

As disclosed herein, in some embodiments a method includes queuing a load-operation instruction in a scheduler queue of a processor. The load-operation instruction includes a load portion and an operation portion. The load portion is scheduled for execution in an execution unit of the processor. The operation portion is marked in the scheduler queue as eligible for execution responsive to scheduling the load portion. Responsive to an indication of an invalid status of the load portion, execution of the operation portion by the processor is suppressed.

As disclosed herein, in some embodiments a processor includes an instruction pipeline including an execution unit operable to execute instructions and a scheduler unit. The scheduler unit includes a scheduler queue and is operable to store a load-operation in the scheduler queue. The load-operation instruction includes a load portion and an operation portion. The scheduler unit schedules the load portion for execution in the execution unit, marks the operation portion in the scheduler queue as eligible for execution responsive to scheduling the load portion, and responsive to an indication of an invalid status of the load portion, suppresses execution of the operation portion.

As disclosed herein, in some embodiments a non-transitory computer readable medium stores code to adapt at least one computer system to perform a portion of a process to fabricate at least part of a processor. The processor includes an instruction pipeline including an execution unit operable to execute instructions and a scheduler unit. The scheduler unit includes a scheduler queue and is operable to store a load-operation in the scheduler queue. The load-operation instruction includes a load portion and an operation portion. The scheduler unit schedules the load portion for execution in the execution unit, marks the operation portion in the scheduler queue as eligible for execution responsive to scheduling the load portion, and responsive to an indication of an invalid status of the load portion, suppresses execution of the operation portion.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
   suppressing execution of an operation portion of a load-operation instruction in a processor responsive to an invalid status of a load portion of the load-operation instruction;
   scheduling a replay of the load portion for execution in the processor;
   generating a sleep request for marking the operation portion ineligible for execution responsive to the invalid status;
   concurrent with generating the sleep request, generating an awake request for the operation portion responsive to scheduling the replay of the load portion; and
   prioritizing the awake request over the sleep request to maintain the operation portion eligible for execution.

2. The method of claim 1, further comprising:
   marking the operation portion eligible for execution in the processor responsive to scheduling the load portion for execution in the processor.

3. The method of claim 2, wherein suppressing execution of the operation portion further comprises marking the operation portion ineligible for execution in the processor.

4. The method of claim 3, wherein marking the operation portion either eligible or ineligible for execution comprises setting a status field in a scheduler queue of the processor.

5. A method comprising:
   queuing a load-operation instruction in a scheduler queue of a processor, the load-operation instruction including a load portion and an operation portion;
   scheduling the load portion for execution in an execution unit of the processor;
   marking the operation portion in the scheduler queue as eligible for execution responsive to scheduling the load portion;
   responsive to an indication of an invalid status of the load portion, suppressing execution of the operation portion by the processor;
   generating a sleep request for marking the operation portion ineligible for execution responsive to the invalid status;
   scheduling a replay of the load portion for execution in the execution unit;
   concurrent with generating the sleep request, generating an awake request for the operation portion responsive to scheduling the replay of the load portion; and prioritizing the awake request over the sleep request to maintain the operation portion eligible for execution.

6. The method of claim 5, wherein suppressing execution of the operation portion further comprises marking the operation portion ineligible for execution in the processor.

7. The method of claim 6, wherein marking the operation portion either eligible or ineligible for execution comprises setting a status field in the scheduler queue.

8. The method of claim 5, wherein marking the operation portion in the scheduler queue as eligible for execution comprises marking the operation portion in the scheduler queue as eligible for execution in an arithmetic execution unit of the processor.

9. The method of claim 5, wherein scheduling the load portion for execution in the execution unit comprises scheduling the load portion for execution in an address generation unit of the processor.

10. A processor comprising:
an instruction pipeline, comprising:
an execution unit operable to execute instructions; and
a scheduler unit including a scheduler queue and operable to:
store a load-operation instruction in the scheduler queue, the load-operation instruction including a load portion and an operation portion,
schedule the load portion for execution in the execution unit,
mark the operation portion in the scheduler queue as eligible for execution responsive to scheduling the load portion,
responsive to an indication of an invalid status of the load portion, suppress execution of the operation portion responsive to the indication of the invalid status,
generate a sleep request for marking the operation portion ineligible for execution responsive to the invalid status,
schedule a replay of the load portion for execution in the execution unit;
generate an awake request for the operation portion concurrently with generation of the sleep request responsive to scheduling the replay of the load portion, and
prioritize the awake request over the sleep request to maintain the operation portion eligible for execution.

11. The processor of claim 10, wherein the scheduler unit is operable to suppress execution of the operation portion by marking the operation portion ineligible for execution in the execution unit.

12. The processor of claim 11, wherein the scheduler unit is operable to mark the operation portion either eligible or ineligible for execution comprises setting a status field in an entry of the scheduler queue corresponding to the load-operation instruction.

13. The processor of claim 10, wherein the execution unit comprises:
an address generation unit for executing the load portion; and
an arithmetic execution unit for executing the operation portion.

* * * * *